CONTROL APPARATUS

Filed July 20, 1956 4 Sheets-Sheet 1

INVENTORS
JACOB GOLDBERG
BONNAR COX
BY Lyon & Lyon
ATTORNEYS

INVENTORS
JACOB GOLDBERG
BONNAR COX
BY Lyon & Lyon
ATTORNEYS

INVENTORS
JACOB GOLDBERG
BONNAR COX
BY Lyon & Lyon
ATTORNEYS

CONTROL APPARATUS

Filed July 20, 1956 4 Sheets-Sheet 4

INVENTORS
JACOB GOLDBERG
BONNAR COX
BY Lyon & Lyon
ATTORNEYS

United States Patent Office 2,867,791
Patented Jan. 6, 1959

2,867,791

CONTROL APPARATUS

Jacob Goldberg and Bonnar Cox, Palo Alto, Calif., assignors, by mesne assignments, to General Electric Company, New York, N. Y., a corporation of New York Application July 20, 1956, Serial No. 599,089
6 Claims. (Cl. 340—174)

Figure 3:
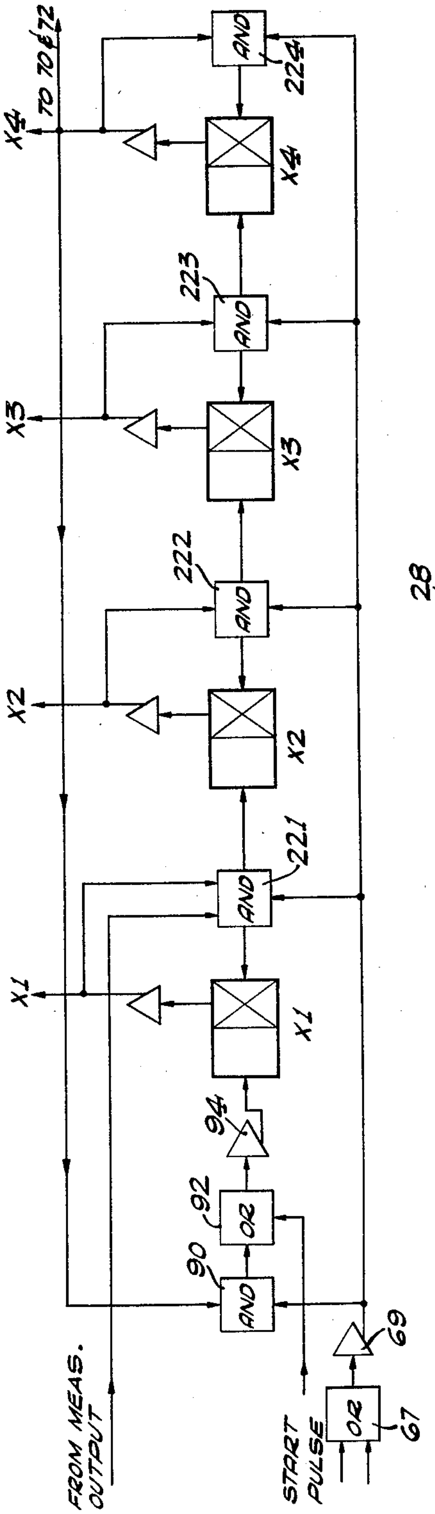

This invention relates to systems for controlling the drive applied to magnetic tape, and, more particularly, to a system for controlling said drive electronically.

Magnetic tape finds employment in information-handling systems as a storage medium for data. The tape is usually kept in reels mounted on tape-handling equipment wherein the tape can be moved past a magnetic transducer head for the purpose of either reading what is already on the tape or writing new data therein. The actual mechanical apparatus required to pull the tape past the head, either in a forward or in a reverse direction, or to stop the tape once it is started, is well known and there are many different arrangements for performing these functions. It is also well known that once tape is running, it cannot be stopped instantaneously. There is a time interval required to bring the tape to a complete halt. If one attempts to reverse the direction of tape motion without first stopping the tape, there is a great likelihood that the tape will be broken.

An object of the present invention is to provide electronic control apparatus for tape-handling equipment which prevents sudden reversals of tape direction and thereby prevents tape from being torn.

Since information-handling machines provide electrical signals indicative of stop, reverse, or go-ahead commands to the tape-drive mechanism, it becomes necessary to insure that there is no confusion by reason of more than one of these commands being issued. Furthermore, it is also necessary to make provision that no false writing on the magnetic tape occurs during any intervals when the tape direction is being changed.

A further object of the present invention is the provision of novel and useful electronic circuit arrangements for preventing confusion of instructions to tape-drive mechanisms.

Yet another object of the present invention is the provision of simple apparatus which prevents more than one instruction to the tape-handling equipment being carried out at any given time.

These and other objects of the invention are achieved by the provision of apparatus wherein a first plurality of flip-flop circuits are employed to store an input command signal. Interlock circuits are provided whereby if the tape-motion control apparatus is already performing the command which is sought to be entered into the input flip-flop circuits, such command is not permitted to be entered therein. A counter is provided which has successive count stages. Upon a command being stored in the flip-flop circuits, the counter is enabled to count through its successive count stages. An output command circuit is provided which, in response to the counter attaining a first predetermined one of its successive count stages, is enabled to provide an output command which removes all drives from the magnetic tape. The tape is thus brought to a stop. Upon the counter attaining a second predetermined count state, the output command apparatus is actuated to emit either a forward-drive command signal or a reverse-drive command signal, dependent upon whether a forward-drive command or a reverse-drive command was stored in the input flip-flops. A further means is provided to insure that the input flip-flops will not store any commands unless the counter is at its initial count condition. Since during the period of transition from one direction of motion to another, or when the tape is standing still, it is desirable to inactivate the magnetic-tape reading heads, apparatus is provided which serves the function of emitting a blanking-pulse signal to the tape-reading apparatus until such transition period has ceased.

Figure 1:
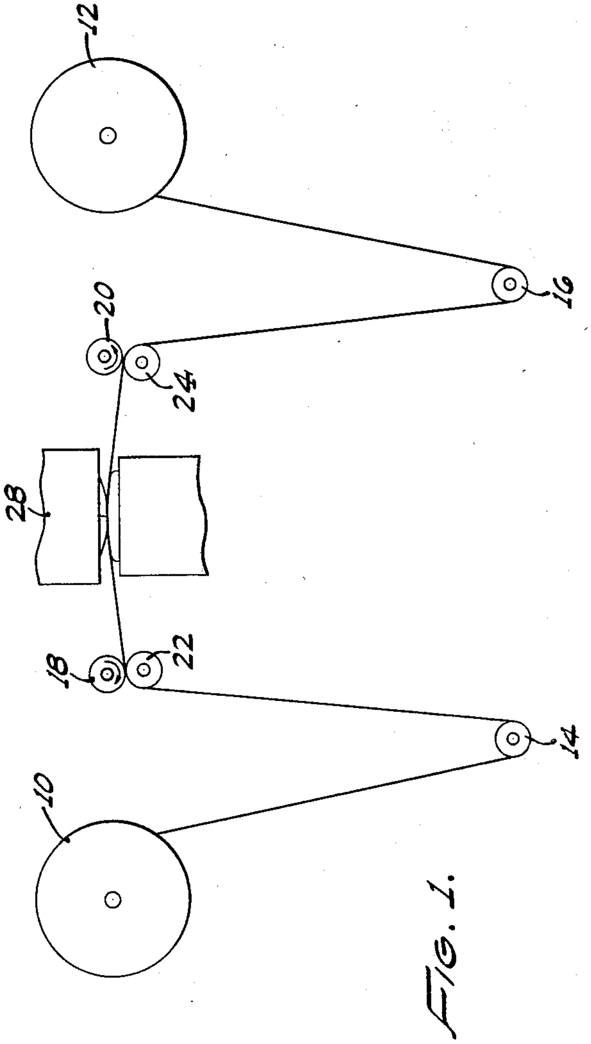
Figure 2A:
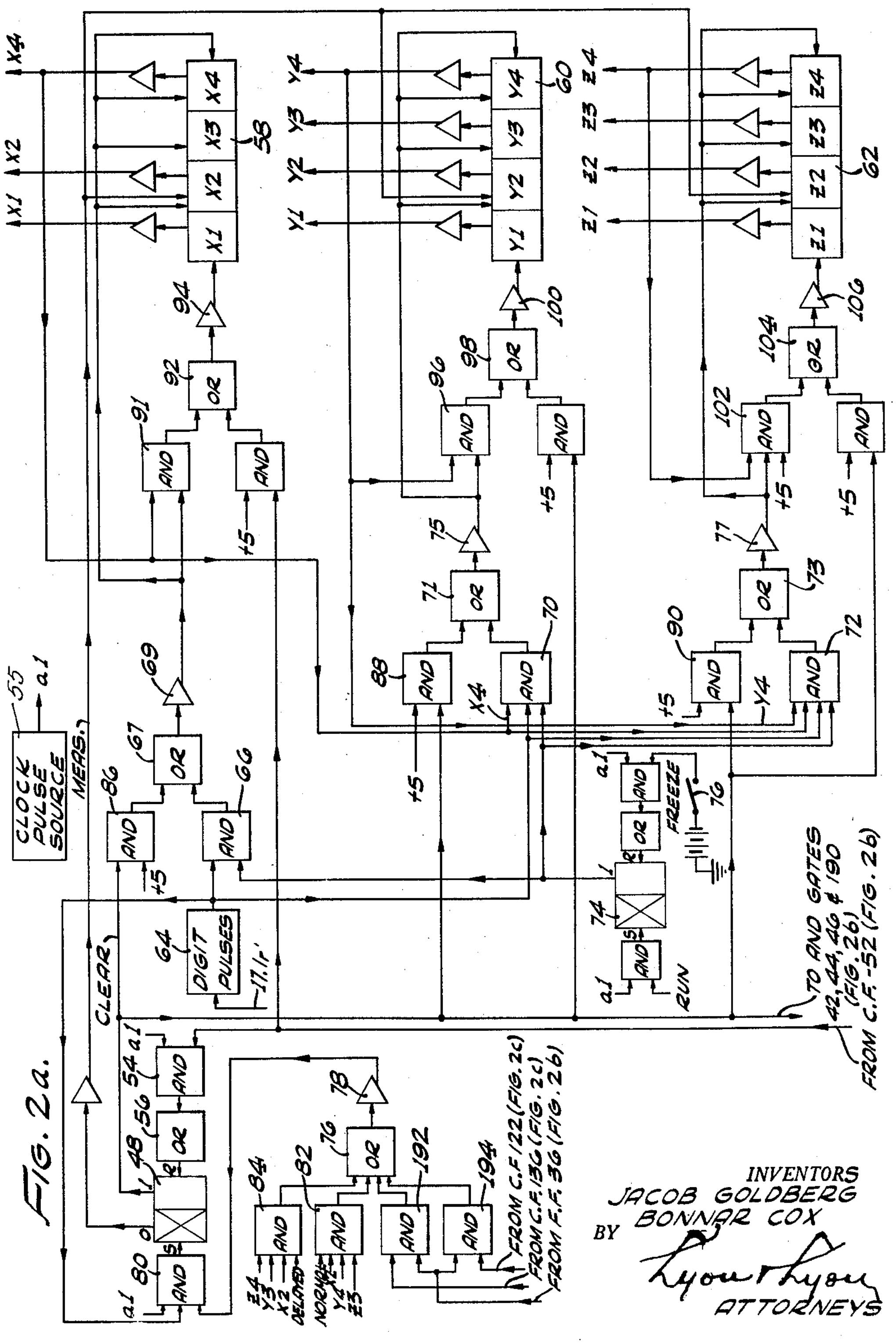
Figure 2B:
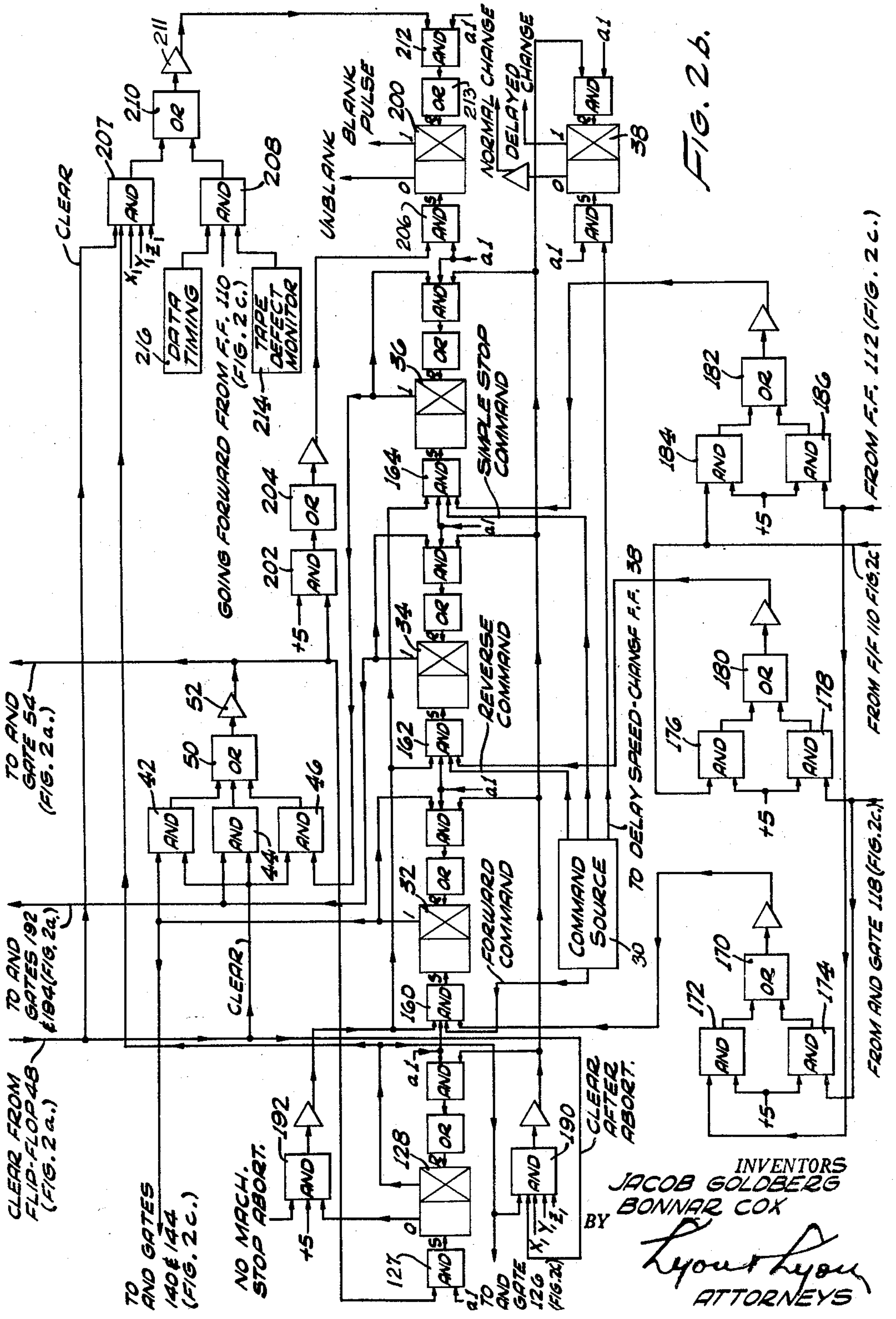
Figure 2C:
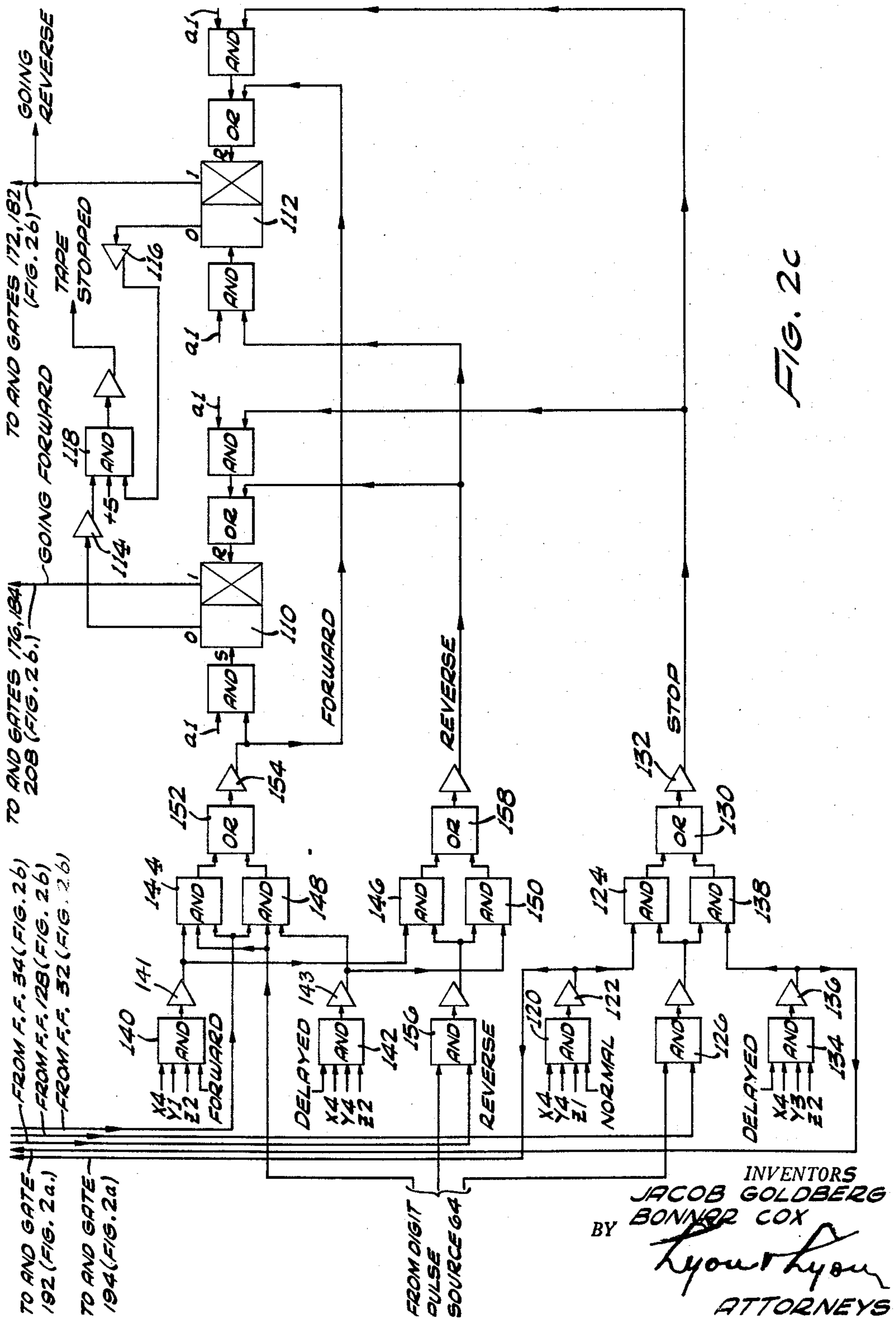

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a drawing of a typical tape-handling apparatus shown by way of illustration of the type intended to be controlled by this invention;

Figures 2A, 2*b*, and 2*c* are block schematic diagrams of an embodiment of the invention; and Figure 3 is a circuit diagram of a counter section suitable for use in the embodiment of the invention.

Figure 1 shows a tape-drive system which is suitable for being controlled by the embodiment of the invention to be described herein. It includes a first tape reel 10 which may be either pickup or feed, a second tape reel 12 which, likewise, may perform the function of either pickup or feed, a pair of tape-tensioning devices 14, 16, which serve the function of keeping the tape under tension at all times, so that the pickup and feed may proceed smoothly. One drive capstan 18 may be designated as the forward-feed capstan, and a second drive capstan 20 may be designated as the reverse-feed capstan. As is well known, these capstans are both continuously driven by motors or from a single motor by the use of belts (not shown). They are opposed by idler capstans 22, 24, which are merely rotatably mounted and are not driven.

When it is desired to pull the tape forward, the capstan 18 is solenoid actuated to press against the tape which is between it and the idler capstan 22. The tape is then pulled forward past the tape head 28. The reel 10 now acts as a take-up reel, and the reel 12 acts as a feed reel. The take-up reel is driven, and the feed reel acts as an idler, being moved by the tape being pulled therefrom. At this time, the reverse capstan 20 is held away from the tape, so that it exerts no effect on it. When it is desired to stop the tape, both the reverse and forward drive capstans 18, 20, are moved away from the tape. Also, both idler and take-up reels are held stationary. This, plus the friction of the tape as it passes under the tape head, is sufficient to bring the tape quickly to a stop. When it is desired to move the tape in a reverse direction, then the reverse feed capstan 20 is brought into contact with the tape opposite the idler 24. In going from one direction to another, it is necessary to first lift the drive capstan from the tape, second, to permit the tape to be brought to a stop, and then, third, to bring the drive capstan which will move the tape in the desired opposite direction to be brought into contact with the tape. If both the reverse and forward capstans are brought into contact wtih the tape simultaneously, the tape will be torn. Damage can occur to the tape also if the rotating capstan is brought in contact with the tape before its motion in the direction opposite to the one to which it will be driven by the rotating capstan has halted.

The usual information-handling system which finds its application in present-day business practices will have at least one and as many as 20 different tape-handling apparatuses of the type generally described in Figure 1. These are usually employed for the purpose of writing or storing information therein and for the purpose of producing the stored information as required. Thus, it is necessary that the commands which are provided to these apparatuses be handled in a manner that affords the maximum protection to the tape being employed. A break in tape, besides causing down time for the system while the tape is being repaired can be the cause of the loss of information from the tape which is the probably more serious matter, as far as successful operation of an information-handling system is concerned. The apparatus employed for emitting the control instructions to the solenoids which move the drive capstans which comprises the embodiment of this invention safeguards against tape breakage by never actuating these solenoids to move the drive capstans to move the tape going from a reverse to a forward direction directly without first causing the tape to be brought to a stop. By the employment of a counter suitable allowances are made for the times required for the apparatus to pass from one state to another. Although, of course, a long interval may be used between executing instructions for safeguarding the tape, this is not a desirable situation since, in the operation of an information-handling system, time is of the essence, and it is desirable to have access for both write-in and read-out to the various tape stations as quickly as possible. Thus, by the employment of a counter which is operated by clock pulses from the system, the minimum safe time for the processing of the commands may be assured and always maintained.

Reference is now made to Figures 2*a*, 2*b*, and 2*c*, which are block schematic diagrams of an embodiment of the invention. First regarding Figure 2*b*, upon the assumption that a computer or information-handling system is providing the commands to the embodiment of the invention, the command source is represented as a rectangle 30, from which four commands may be emitted, a forward command, a reverse command, a simple stop command, and a delay speed-change command. The latter command, as will be shown more fully later, permits longer intervals of time to elapse between the receiving of a command and the carrying out of that command. This may be desirable in certain instances where it is desired to perform other functions before the tape changes speed or direction.

These commands are stored in what may be termed as input flip-flop apparatus. This input flip-flop apparatus includes a forward command flip-flop 32, in which a forward command is stored, a reverse command flip-flop 34, in which a reverse command is stored, a simple stop command flip-flop 36, in which the simple stop command is stored, and the delay speed-change flip-flop 38, in which the delay speed-change command is stored. To facilitate the subsequent explanation herein, it should be noted that the flip-flops which are represented by the rectangles are the well-known two stable-state circuit as may be found described and shown in a book entitled Electronics, by Elmore and Sands, on pp. 105 et seq., published by The McGraw-Hill Book Company in 1949. These flip-flops have one stable state, known as a reset state, which is the standby state in which they are usually placed before a signal is entered or applied thereto, and a set state, to which they are driven by the application of the command signal. When the flip-flop is driven to its set state, then output is obtained from the terminal designated by the one; when in the reset state, then output is obtained from the terminal designated by the zero. Thus, an input command to any one of the flip-flops is applied to the set side thereof, and will provide its one output terminal to provide output or to become high.

The delay speed-change flip-flop 38 in its standby condition—that is, without a delay-speed-signal input—provides output from its zero terminal. This can be considered the normal state, and the output is received by various circuits of the equipment and will be labeled as "normal." The one output terminal of this flip-flop provides an output which is designated as "delayed." It will be so designated at the inputs to the various circuits of the apparatus to which it is applied. The forward-command, reverse-command, and simple-stop-command flip-flops 32, 34, and 36 each one has its one output respectively connected to And gates 42, 44, and 46. These And gates have as their second required, or enabling, input an output from a flip-flop 48 (Figure 2*a*), which can be called the counter flip-flop. The counter flip-flop provides two outputs for each one of its stable states. When in its reset state, the output is designated as the "measure" output to the succeeding counter (shown in Figure 2*a*). When in its set state, the counter output is designated as the "clear" output. This "clear" output, besides being applied to the succeeding counter apparatus, is also applied as the second required input to the And gates 42, 44, 46 (shown in Figure 2*b*).

The output of And gates 42, 44, 46 are applied to an Or gate 50, and the output of the Or gate is applied through a cathode follower 52 to succeeding apparatus. The Or gate, as is well known, is a buffer storage circuit which has a plurality of inputs and provides an output when any one of the inputs is excited. The output from the cathode follower 52 is applied to a succeeding And gate 54 (Figure 2*a*). This And gate has as its other required input a clock pulse *a*1 from a clock pulse source 55. Present-day information-handling machines, with which the apparatus herein is associated usually employ a source of timing pulses, known as a "clock-pulse source" for timing the operation of the machine. The source 55 may be a magnetic drum or a crystal oscillator. The input to all And gates which is derived from the clock-pulse source 55 is designated in these circuits by *a*1. The And gate 54 output drives an Or gate 56, which in turn applies an input to the reset side of the flip-flop 48. Upon being reset, the flip-flop 48 is driven to its measure state. The measure state output is applied to the succeeding counter stages (Figure 3) to enable them to count past an initial count condition. The counter employed herein is one which is described and claimed in an application for a Gated-Delay Counter, by James E. Heywood, Serial No. 400,645, filed December 28, 1953, and assigned to a common assignee.

The counter (shown in Figure 2*a*) consists of three sections, respectively designated as the X-section 58, the Y-section 60, and the Z-section 62. Each section has four binary stages. The operation of the counter as in usual counter practice requires the first section to count through to its last count state, whereupon the second counter section is enabled to advance one count. The first counter must fill for each one count advance of the second counter. Each time the second counter fills the third counter may advance one count. Each counter section is wired to circulate. The complete counter is of the type that after having completed a count through all its counter states, it returns to its iniial count condition.

A block diagram of a preferred type of counter for use in this invention is shown in Figure 3 of the drawings and will be described in more detail infra. At this point, however, it should be understood that in each counter section there are four flip-flops separated by And gates. A preceding flip-flop cannot trigger a succeeding flip-flop unless the And gate through which the preceding flip-flop output is applied to the succeeding flip-flop has all the required inputs. The required input to enable the first flip-flop stage X–1, for example (shown in Figure 3), to trigger the succeeding flip-flop stage X–2, requires amongst other inputs the measure input. This measure input is applied to the And gate 221 between the first and second flip-flops of each one of the sections of the counter. The counter is advanced to its successive count stages by pulses applied thereto which are derived from the clock-pulse source. These pulses may be termed digit pulses and are the ones of the clock pulses which occur upon the commencement of each word in an information-handling system of the type with which the present invention is employed. The source for these is represented by rectangle 64 in Figure 2*a*. Of course, this is not to be construed as a limitation, since any other desired pulse source may be employed instead.

The pulses from the digit-pulse source 64 (shown in Figure 2*a*) are applied to And gates 66, 70, and 72 (shown in Figure 2*a*). A second required input to these And gates is the output of a flip-flop 74 which may be termed a manual-stop flip-flop. When this flip-flop is in its set condition, its one output is high and is applied to the And gates 66, 70, 72. When it is desired to stop the counter, a stop-signal input is applied to the reset side of the flip-flop 74 by a means such as the switch 76, whereby the input to the And gates is removed and the digit pulses are no longer applied to the counter to advance it.

The output of each one of the And gates 66, 70, and 72 is applied to a succeeding Or gate 67, 71, and 73. The output of these respective Or gates is applied through cathode followers 69, 75, 77 to the And gates in the respective counter sections X, Y, and Z.

The counter then is enabled to count through its successive counter states. The output from each one of the flip-flops in a counter section is designated as Z–1, or Y–2, or Z–3, representative of the position of a flip-flop in the counter section, as well as the counter section. These outputs are all applied through cathode followers to succeeding apparatus. To avoid confusion in the drawings, the inputs to the succeeding apparatus will not be connected to the respective counter stages, but will be represented by the letter X–2, Z–3, or Y–4, indicative of the output of the counter to which it is connected. The counter flip-flop 48 (shown in Figure 2*a*) is set to its clear condition providing a "clear" output by receiving output from an Or gate 76 (shown in Figure 2*a*) applied through a cathode follower 78 to an And gate 80, the output of which is applied to the set side of the counter flip-flop 48. Other required inputs to the And gate 80 are the clock-pulse input and the digit-pulse input. The Or gate 76 may have as one input the output of an And gate 82, which has as its required inputs the X–2, Y–4, and Z–3 states of the counter plus the normal input. This normal input is the output from the delay-speed-change flip-flop 38 (shown in Figure 2*b*) when it is in its reset condition. A second input to the Or gate 76 (shown in Figure 2*a*) is provided by the And gate 84, which has as its required inputs the X–2, Y–3, and Z–4 states of the counter, as well as the input from the delay-speed-change flip-flop when it is in its delayed condition of stability. The other inputs to the Or gate 76 will be discussed subsequently.

When the clear input to the counter is high, the measure input is removed, and thus the counter cannot count beyond the initial count condition. The reason for this is that the measure input is an enabling input to an And gate between the X–1 and X–2 counter stages (221 in Figure 3, for example) the Y–1 and Y–2 stages, and the Z–1 and Z–2 counter stages. The clear output serves to enable And gates 86, 88, and 90 (shown in Figure 2*a*), which have a D. C. bias as their other required input. This permits the counter to continue counting, despite the removal of the measure-enabling input, until it reaches its clear state. The clear state of the counter is the one wherein it is in its initial count condition. It should be noted that And gate 70 (shown in Figure 2*a*) has, as one of its required inputs, an output from the fourth stage of the X-section of the counter which is attained after four counts. Besides this, inputs are also applied to And gate 72; And gate 72 has as its other required input the output of the Y–4 stage of the Y-section of the counter. This insures that the sections of the counter count in succession.

In order to assure that the various counter sections are recycled back to the initial counter state, And gate and Or gate logic are provided similar to what has just been described. Thus, for the X-section of the counter an And gate 91 receives as one of its inputs the output of cathode follower 69 and as a second input the output of the X–4 stage of the X-section of the counter. The output of the And gate 91 is applied through an Or gate 92 and cathode follower 94 to the X–1 stage of the counter. An And gate 96 receives the output from a cathode follower 75 and second the output from the Y–4 stage of the Y-section of the counter. This is applied through Or gate 98 and cathode follower 100 to stage Y–1 of the Y-section of the counter. And gate 102 receives an output from a cathode follower 75 and the Z–4 stage of the Z-section of the counter. This is applied through the Or gate 104 and cathode follower 106 to the first stage of the counter.

The output-command signals for the embodiment of the invention shown here are provided by two flip-flops 110, 112 (shown in Figure 2*c*). The first flip-flop 110, when in its set condition, provides an output command to the tape-handling apparatus to go forward. The second flip-flop 112, when in its set condition, provides an output command to the tape-handling apparatus to go in reverse. These commands are interpreted simply by applying these signals to energize the respective solenoids which control the tape-drive capstans.

When both the flip-flops 110, 112 are in their zero, or reset state, this is sensed through cathode followers 114 and 116 and through an And gate 118 to provide an output indicative of the stop command. The stop command energizes the solenoids (not shown) which actuate both drive capstans (18, 20, Figure 1) to lift them from the tape. When flip-flop 110 is in its set condition, an output indicative of the going-forward command is provided. At this time, flip-flop 112 is in its reset condition. When flip-flop 112 is in its set condition, an output indicative of going in reverse is provided thereby. At this time, flip-flop 110 is in its reset condition. When both flip-flops are in their reset condition, then an output indicative of the command that the tape should stop is provided.

The arrangement of the logic for directing the described operation of flip-flops 110 and 112 includes a plurality of And gates and Or gates which are energized by both the outputs from the input flip-flops 32 through 36 (shown in Figure 2*b*) and the counts from the counter (shown in Figure 2*a*) attaining the successive preselected count states which are determined as required to provide sufficient time to elapse to protect the operation of the tape-handling apparatus. Thus, whether a forward or a reverse, or a stop command, is received, an And gate 120 (shown in Figure 2*c*) is enabled by the counter states Z–1, Y–4, and Z–4—also upon the receipt of the normal output of flip-flop 38. The output of this And gate is applied through a cathode follower 122 to a second And gate 124. A second required input to the second And gate is the output of an And gate 126, which has as one input a pulse from the digit-pulse source 64 and as a second input the set output of a flip-flop 128 (shown in Figure 2*b*), which is set every time the counter is enabled by the output from Or gate 50 and applied to the set side of flip-flop 128 through an And gate 127. Thus, the output of And gate 126 (shown in Figure 2*c*) enables And gate 124 to provide an output. This is applied through a succeeding Or gate 130 and a cathode follower 132, to apply reset signals to the flip-flops 110 and 112. Thereby, they are driven to the condition with their zero outputs high, which is sensed, to provide an output command to cause the tape to stop.

In the event it is desired that the stopping of the tape should occur at a later period than first indicated, then a signal is applied to the delay flip-flop 38 (shown in Figure 2*b*) to place it in its set condition, which is indicative of the fact that the delay in the speed change of the tape is required. The one output terminal of this flip-flop applies a delay signal to an And gate 134 (shown in Figure 2*c*). This And gate has as its other required inputs X–4, Y–3, and Z–2 states of the counter. The output of this And gate is applied through a cathode follower 136 to an And gate 138. This And gate applies its output to the Or gate 130. The input to this And gate is also the output from And gate 126. Thus, the stop command will be applied to lift the two capstans from the tape at a later time than when the flip-flop 38 is in its reset condition. It should be noted that the stop operation occurs regardless of whether the input command is forward, reverse, or stop.

Assume now that a forward command is stored in the input flip-flop 32 (shown in Figure 1). Then And gate 140 (shown in Figure 2*c*) is enabled upon the counter states X–4, Y–1, Z–2 being reached and the other required input being present which is the normal output of the flip-flop 38. The And gate 142 is the delay counterpart of And gate 140. And gate 142 is enabled upon receiving the X–4, Y–4, and Z–2 signals from the counter and the delay-signal output from the flip-flop 38. The outputs of And gates 140 and 142 are applied through cathode followers 141 and 143 respectively to And gates 144, 146, and to And gates 148 and 150. To enable the And gate 144 or 148, there is required as the second input the output of flip-flop 32 when in its set condition. A third input is the digit-pulse input to the And gates. When either And gate 144 or 148 is enabled, its output is applied to an Or gate 152 and a succeeding cathode follower 154 to drive flip-flop 110 to its set condition and flip-flop 112 to its reset condition.

Should a reverse command have been stored in flip-flop 34 instead of a forward command in flip-flop 32, then And gates 146 or 150 are enabled, depending upon whether the delayed or normal speed change is required. And gate 156 provides the second required inputs to And gates 146 and 150. This And gate has as its two required inputs one from the reverse flip-flop 34 when in its set condition and the other a digit pulse. Or gate 158 provides through the cathode follower the signal to drive flip-flop 110 to its reset state and flip-flop 112 to its set state. It should be noted that whether the command is to go in reverse or to go forward, the output flip-flops 110 and 112 are driven to provide the required command at the same time. This time is set by the input to And gate 140, when a normal change is required and by the input to And gate 142 when a delayed change is required.

Assume either a forward, reverse, or a stop command is issued and the tape-handling apparatus is at that time already in the forward, reverse, or stop condition. Obviously, it is not necessary for this apparatus to function if the tape apparatus is already performing the instruction which is issued thereto by the computer. In order to insure that an operation did not occur under these circumstances, interlock apparatus is provided. This consists of logic which is coupled to the outputs of the flip-flops 110 and 112 (shown in Figure 2*c*), whereby if a command is issued by the input, which command is already carried out by the tape-handling apparatus, the input command will not be stored by the input flip-flops. Thus, it will be noted that the input command to the input flip-flop 32 (shown in Figure 2*b*) is entered through an And gate 160. The input command to flip-flop 34 is applied through an And gate 162, and the input command to flip-flop 36 is applied through an And gate 164. A second required input to And gate 160 is the timing pulse, and a third required input is the output from an Or gate 170. This Or gate receives its input from an And gate 172 or from an And gate 174. These And gates are biased so that when And gate 172 receives a reverse-signal command from flip-flop 112, it applies an output to the Or gate 170, whereby And gate 160 is enabled. Alternatively, when And gate 174 receives a signal from the output of And gate 118, indicative of the fact that the tape stop command has been issued, the output of And gate 174 is applied to And gate 160, so that the forward command can be stored. Thus, the apparatus described prevents the entry of a forward command into the apparatus in the event that the tape apparatus is already going forward by virtue of the fact that the input And gate 160 is not enabled at that time.

And gate 176 and 178 (shown in Figure 2*b*) respectively apply their outputs to an Or gate 180 upon receiving an input indicative that the tape is either going forward or stopped. The output of Or gate 180 will enable the And gate 162 into which the reverse command is applied. Such enabling occurs only if the tape is going forward or has stopped. If the tape is already in reverse, the And gate 162 will not be enabled and the command will not be entered into the apparatus. Or gate 182 applies its output to the And gate 164, into which a simple stop command is applied. The Or gate 182 can apply such output only upon receiving an input from And gate 184 or And gate 186. And gate 184 is enabled to provide the required output when it receives a going-forward command signal from flip-flop 110 or a going-reverse signal from flip-flop 112, which is applied to And gate 186. Thus, the interlock apparatus functions as previously indicated to prevent the entry and storage of a command when the tape apparatus is already performing such command.

The input flip-flops 32, 34, 36 are all reset when the counter is returned to its initial count condition by the output from an And gate 190 (shown in Figure 2*b*). This And gate output also serves to reset the delayed speed-change flip-flop 38. This And gate has as one required input the output of the flip-flop 128 when in its set condition, the second required input, the output of flip-flop 48 when in its clear condition. This clear condition is achieved when the counter attains either the X–2, Y–4, Z–3 count condition under normal conditions, or the X–2, Y–3, Z–4 count condition when a delayed change is required. It will be recalled that these are the inputs to And gates 82 and 84 shown in Figure 2*a*). A third required input to And gate 190 (shown in Figure 2*b*) is the output of the counter when it is in its initial count condition, represented by X–1, Y–1, and Z–1. It should be noted that the output of flip-flop 128, when in its reset condition, is applied through an And gate 192 as the third required enabling input to And gates 160, 162, and 164. And gate 192 has as another of its required inputs a signal from whatever information-handling system with which it is employed that nothing is going wrong and thus the tape operations to be undertaken should not be aborted. Such signal is usually provided when the information-handling machine is operating properly and the various apparatuses throughout the system which are employed for monitoring such proper operations indicate that this is the situation. Of course, this input may be omitted, if desired. Flip-flop 128 is set upon the occurrence of output from Or gate 50 through cathode follower 52, which it will be recalled occurs when the counter is enabled to start counting through its successive count conditions.

From what has been described, it should be apparent that the input flip-flops 32, 34, and 36 are not permitted to receive an input command in the event something has gone wrong with the information-handling machine. Furthermore, no input command may be received, once the system has undertaken to function in accordance with an input command already received. When a command already received has been effectuated, then the input flip-flops are reset for the purpose of being able to receive the next input command. Or gate 76 (shown in Figure 2a), which serves the function of providing an output to set flip-flop 48, receives an input from two other And gates 192, 194. And gate 192 is enabled when an input is received from the flip-flop 36, which is a simple stop flip-flop, in its set condition and also the second input from the output of And gate 134 (shown in Figure 2c). And gate 194 (shown in Figure 2a) also is enabled when the output is received from the stop-command flip-flop 36 and from the output of And gate 120 (shown in Figure 2c). And gates 120 and 134, it should be recalled, are the And gates whose outputs are applied to Or gate 130 for the purpose of issuing the stop command.

Another function performed by the apparatus already described is to provide signals whereby the tape-reading apparatus is instructed to stop or prevent reading of further data until the tape is going forward at the proper speed. This function is provided by a flip-flop 200 (shown in Figure 2b), which, in its set condition, provides an output which may be identified as a blank pulse output and in its reset condition provides an unblank pulse output. A blank pulse output may be employed to bias off the tape-reading equipment (not shown); the unblank output may be employed to enable the tape-reading equipment. The output of Or gate 50 (shown in Figure 2b), which enables the counter and starts the operation of the system, is applied through cathode follower 52, an And gate 202, and an Or gate 204 to drive flip-flop 200 through an input And gate 206. It should be recalled that the Or gate 50 is enabled to provide an output whenever a reverse command, forward command, or simple stop command input is received by the input flip-flops. Thus, the tape-reading equipment is prevented from operating until the time when flip-flop 200 is reset. This reset can occur when the flip-flop 48 provides a clear signal to an And gate 207 and the counter is in its X–1, Y–1, Z–1 state, and, furthermore, an output is received from flip-flop 128 in its set condition. Another And gate 208 provides an enabling output to operate the flip-flop 200 to its unblank condition through Or gate 210, cathode follower 211, And gate 212 and Or gate 213 when the And gate 208 receives a signal from the flip-flop 110 (shown in Figure 2c) that the tape is going forward, a second input from apparatus which can be designated as the tape-defect monitor 214, and from other apparatus which can be designated as data timing 216. The tape-defect monitor 214 is apparatus which monitors the tape to observe whether or not there are any defects thereon which have been previously marked by a system such as is described in a patent, No. 2,793,344, for Magnetic Record Testing Means, by Donald K. Reynolds.

The rectangle 216 (shown in Figure 2b) labeled "data-timing" represents apparatus which comes into play to unblank the flip-flop 200 and the subsequent tape-reading apparatus when, in the course of going forward, the space for the incoming data to be read appears prior to the counter returning to its X–1, Y–1, Z–1, or cleared state. Thus, in tape systems where a pulse is placed on the tape to signify the approach of the end of the last item of data, such pulse may be read and utilized to provide the data-timing pulse for unblanking the writing apparatus at the time as specified above.

Figure 3 represents one section of the counter to illustrate the preferred type of counter employed herein. As previously indicated, this counter is described and claimed in detail in an application for a Gated-Delay Counter. There is shown by way of illustration, the X-section of the counter having stages X–1, X–2, X–3, and X–4. It will be noted that the four trigger circuits of the counter are separated by And gates 221, 222, 223, and a final And gate 224. The input to the first flip-flop is derived from the output of cathode follower 69, which simultaneously applies its output to the other And gates in the counter section. It will be noted that the And gate 91 (shown in Figure 2a) has as its input the output from flip-flop X–4 when in its driven, or second stable, condition as well as the output from cathode follower 69. Thus, the X–1 stage can only be driven to its second stable condition after the X–4 stage has been driven to its second stable condition. The same pulse which drives the X–1 stage also resets the X–4 stage through And gate 224 (shown in Fig. 3), which has as its second required input the output from flip-flop X–4, or the fourth stage of the counter. The second flip-flop stage X–2 is driven from the And gate 221. The required inputs to And gate 221 are, first, the output from the cathode follower circuit 69, second, the output from the X–1 stage when in its second stable condition, and, third, the output from flip-flop 48 (shown in Figure 2a) when in its reset, or measure, condition. Flip-flop X–2 is then driven to its second stable state, wherein it enables the And gate 222 to apply the succeeding output pulse from cathode follower 69 to drive the X–3 stage of the counter. And gate 223 is then enabled, and, when the succeeding pulse output from cathode follower 69 is received, it drives the succeeding X–4 stage of the counter.

It should be noted that the And gates 221, 222, and 223, besides driving with their outputs the succeeding stages of the counter, also reset the preceding counter stages. When the fourth, or X–4, stage of the counter is driven to its second stable condition, it is enabled to apply an output to the succeeding And gates 70 and 72 (shown in Figure 2a). These And gates, it will be recalled, are the input And gates to the second and third counter sections. The second counter section can then count the next pulse received from the digit-pulse source, the third counting section can count this next pulse received from the digit-pulse source only if the Y-section of the counter has its Y–4 stage in the second stable state. This next counting pulse also resets the fourth stage of the counter, wherein the count pulse which occurs thereafter can start the counter counting again.

From the above description, it should now be apparent how the embodiment of the invention can receive input commands, can store those commands only if the commands are not already being carried out by the tape-transport apparatus, and then only if the apparatus has already completed the execution of a previous command. After the elapse of a suitably timed interval as determined by a counter, an output command is given to the tape transport apparatus, which first stops the tape and then orders it to go in the direction indicated by the input command. Additional apparatus is provided for delaying the execution of commands, if required. Provision is also made with this apparatus to insure that the tape-reading apparatus is not enabled during the interval within which the direction or speed of the tape is being changed. Provision is also made for clearing the counter and for preventing or inhibiting the operation of the apparatus in the event that a system from which the commands are being derived operates in a faulty manner.

There has therefore been described and shown hereinabove a novel, simple, and useful apparatus for controlling the motion of tape by issuing instructions in the proper sequence and with the proper timed intervals to the tape-transport apparatus.

We claim:

1. In a magnetic-tape recording system apparatus for controlling the drive applied to said tape in response to forward, reverse, and stop commands, said apparatus comprising input circuits for storing a command, interlock means for preventing storage of a command by said input circuits if an identical command is already being stored, means for preventing storage of a further command until the first command is fulfilled, a counter having a plurality of successive count states, means for enabling said counter to count through said states responsive to a command being stored by said input circuits, means to prevent reading from said tape responsive to said counter being enabled by said enabling means, output command circuits, means for instructing said output command circuits to issue a first signal representative of a command to remove all drives from said tape responsive to said counter attaining a first count state, means for instructing said output command circuits to issue a second signal representative of a command to apply a reverse drive responsive to a reverse-command signal in said input circuits and to said counter reaching a second count state, means for instructing said output-command circuits to issue a third signal representative of a command to apply a forward drive responsive to a forward command in said input circuits and to said counter reaching said second count state, and means responsive to said output-command circuits issuing command signals to inactivate said means to prevent reading from said tape.

2. In a magnetic-tape recording system as recited in claim 1 wherein said input circuits for storing a command includes first, second, and third flip-flop circuits each having a first and second stable state, first, second, and third coincidence gates each having their outputs respectively connected to said first, second, and third flip-flop circuits to respectively drive them from the first to the second stable state in the presence of an output, means for applying a forward command signal to said first coincidence gate input, means for applying a reverse-command signal to said second coincidence gate input, and means for applying a stop-command signal to said third coincidence gate input, said interlock means comprising a first means to apply an enabling signal to said first coincidence gate input responsive to said output-command circuits providing as output either a reverse drive or a remove-all drive representative command signal, means to apply an enabling signal to said second coincidence gate input responsive to said output-command circuits providing as output either a forward drive or a remove-all drive representative command signal, means to apply an enabling signal to said second coincidence gate input responsive to said output-command circuits providing as output either a forward drive or a remove-all drive representative command signal, and means to apply an enabling signal to said third coincidence gate input responsive to said output-command circuits providing as output either a forward drive or a reverse drive representative command signal.

3. In a magnetic-tape recording system as recited in claim 1 wherein said output-command circuits include two flip-flop circuits each having a first and second stable condition, one of which when in its second stable condition provides a third signal output, said other of said flip-flop circuits when in its second stable condition provides a second signal output, a coincidence gate, means coupling the input of said coincidence gate to said two flip-flops to derive outputs therefrom only when they are in their first stable condition whereupon said coincidence gate provides as output a first signal.

4. In a magnetic-tape recording system as recited in claim 2 wherein said means for preventing storage of a further command until the first command is fulfilled includes an abort flip-flop having a first and second stable state, means to apply output from said abort flip-flop when in its first stable state to said first, second, and third coincidence gates, means to drive said abort flip-flop to its second stable state responsive to said counter being enabled to count by said counter enabling means whereby said first, second, and third coincidence gates are disenabled, and means responsive to said counter attaining an initial count condition to drive said abort flip-flop to its first stable state.

5. In a magnetic-tape recording system, apparatus for controlling the drive applied to said tape in response to forward, reverse, and stop commands, said apparatus comprising first, second, and third input flip-flop circuits, fourth and fifth output flip-flop circuits, each of said flip-flop circuits having a first and second stable state and being driven from one to the other in response to input thereto, said fourth flip-flop circuit when in its second stable condition providing an output signal for commanding said tape drive to drive said tape forward, said fifth flip-flop circuit when in its second stable condition providing an output signal for commanding said tape drive to drive said tape in reverse, gate means responsive to said third and fourth flip-flop circuits being in said first stable condition to provide an output signal for commanding said tape drive to remove all drive from said tape, first, second, and third coincidence gates each having their outputs respectively connected to said first, second, and third flip-flop inputs to drive them from their first to their second stable states, means to apply a forward command to said first coincidence gate, means to enable said first coincidence gate responsive to an output either from said fifth flip-flop when in said second stable state or from said gate means, means to apply a reverse command to said second coincidence gate, means to enable said second coincidence gate responsive to an output either from said fourth flip-flop or from said gate means, means to apply a stop command to said third coincidence gate, means to enable said third coincidence gate responsive to an output either from said fourth flip-flop circuit when in its second state or said fifth flip-flop circuit when in its second stable state, a counter having a plurality of successive count states, means for enabling said counter to count through said states responsive to either said first, second, or third flip-flop circuit being driven to a second stable state, means to prevent reading from said tape responsive to said counter being enabled to count, means to drive said fourth and fifth flip-flops to said first stable state responsive to said counter attaining a first predetermined one of its count states, means to drive said fourth flip-flop to its first stable state and said fifth flip-flop to its second stable state responsive to said counter attaining a second predetermined one of its count states and said second flip-flop being in its second stable state, means to drive said fiourth flip-flip to its second stable state and said fifth flip-flop to its first stable state responsive to said counter reaching said second predetermined count condition and said first flip-flop being in its second stable state, and means to inactivate said means to prevent reading from said tape responsive to output from said fourth flip-flop being in its second stable state.

6. In a magnetic-tape recording system as recited in claim 5 wherein there is included a means for resetting said first, second, and third flip-flops to their first stable state, said means including an abort flip-flop circuit having a first and second stable state, means to drive said abort flip-flop circuit from its first to its second stable state responsive to said counter being enabled to count, and means responsive to said counter being returned to an initial count state and to output from said abort flip-flop when in its second stable state to reset said first, second, and third flip-flops to their first stable state.

References Cited in the file of this patent

UNITED STATES PATENTS

| | | |
|---|---|---|
| 2,616,628 | Lake | Nov. 4, 1952 |
| 2,782,398 | West et al. | Feb. 19, 1957 |